(12) United States Patent
Martin (10) Patent No.: US 7,991,930 B2
(45) Date of Patent: Aug. 2, 2011

(54) DATA STORAGE DRIVE AND METHOD EMPLOYING DATA COMPRESSION

(75) Inventor: Christopher Martin, Bath (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1607 days.

(21) Appl. No.: 10/783,031

(22) Filed: Feb. 23, 2004

(65) Prior Publication Data

US 2004/0179284 A1 Sep. 16, 2004

(30) Foreign Application Priority Data

Feb. 22, 2003 (GB) .................................. 0304052.4

(51) Int. Cl.
*G06F 13/12* (2006.01)
*G06F 13/38* (2006.01)

(52) U.S. Cl. .......................................................... 710/68

(58) Field of Classification Search .................... 710/68, 710/100; 360/69, 70, 71; 341/51
See application file for complete search history.

(56) References Cited

U.S. PATENT DOCUMENTS

| | | | | |
|---|---|---|---|---|
| 4,423,480 A * | 12/1983 | Bauer et al. | ................... | 710/100 |
| 5,097,261 A * | 3/1992 | Langdon et al. | ................. | 341/51 |
| 5,671,389 A | 9/1997 | Saliba | | |
| 5,969,897 A * | 10/1999 | Morita | ...................... | 360/73.01 |
| 6,069,763 A * | 5/2000 | Aoki | ............................... | 360/70 |
| 6,122,124 A | 9/2000 | Fasen et al. | ..................... | 360/51 |
| 6,169,842 B1 | 1/2001 | Pijnenburg et al. | | |

FOREIGN PATENT DOCUMENTS

| | | |
|---|---|---|
| EP | 0784261 A1 | 7/1997 |
| WO | 98/11547 A1 | 3/1998 |

OTHER PUBLICATIONS

Examination Report for GB 0402873.4 dated Aug. 10, 2005.

* cited by examiner

*Primary Examiner* — Tariq Hafiz
*Assistant Examiner* — Aurangzeb Hassan (57) ABSTRACT

A tape drive unit has a data compression engine coupled to an incoming data stream. A buffer memory stores data of the incoming data stream. A control module enables or disables the data compression engine in response to a function of the data occupancy level of the buffer memory.

6 Claims, 6 Drawing Sheets

DATA STORAGE DRIVE AND METHOD EMPLOYING DATA COMPRESSION

FIELD OF THE INVENTION

The present invention relates to the field of data storage, and particularly although not exclusively, to an improved method of and apparatus for storage of data on a dynamic data storage medium.

BACKGROUND TO THE INVENTION

It is known in the prior art to provide a data storage device externally to, or integrated within a host computer device, for the purpose of backing up data and systems stored on the host computer. Typically, data is sent from a host computer device to a tape drive unit, and the data is stored to a tape data storage medium provided in a cartridge which is removable from the tape drive unit.

Figure 1:
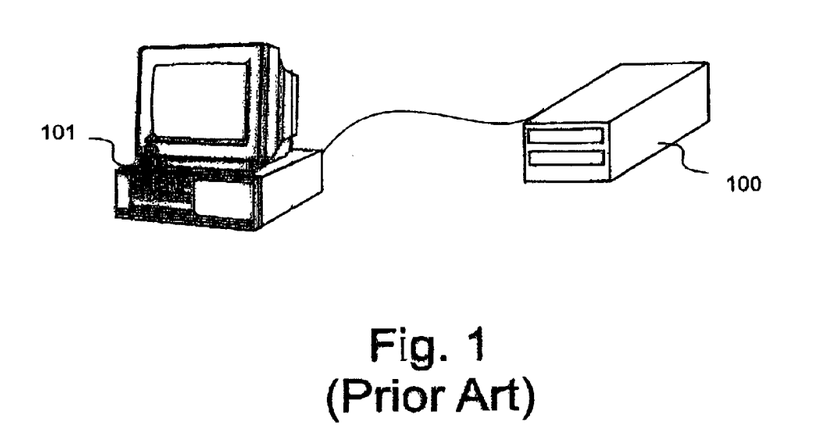
FIG. 1, as described, is an illustration of a prior art host computer and prior art tape drive unit capable of receiving data from the host computer.

Referring to FIG. 1 herein, a known tape drive device 100 receives data from a host computer device 101, which may be networked to a plurality of other computers.

In general, data transferred from a host computer to a tape drive unit is 'bursty' that is, it is transmitted in chunks of data, followed by periods of no data. The data chunks are in general of variable and unpredictable length. Since the tape drive contains a tape transport mechanism which is electro-mechanical, and involves a tape data storage medium travelling past a read/write head, stopping and starting of the tape drive mechanism is best minimised or avoided for the following reasons.

Firstly, excessive stopping and starting of the tape drive mechanism reduces the reliability of the mechanism over time.

Secondly, stopping and starting of the tape drive mechanism requires re-positioning of the tape relative to the read/write head, which is time consuming, and therefore reduces the rate at which data can be written to the tape data storage medium, particularly for linear tape drives.

In order to achieve optimum data throughput from the tape drive mechanism, the tape must be kept 'streaming', that is kept moving past the read/write head. To keep the tape data storage medium streaming past the read/write head, bursty data received from the host computer device is read into a buffer, which temporarily stores the data, removing some of the burstiness of the data. Continuous data exits the buffer at a more constant data rate determined by the rate at which the data can be written to the tape. In prior art tape drive devices, the rate determining step in writing data to a data storage medium is the relatively low rate at which data can be written from a write head to the tape. Although there is a problem of keeping the tape streaming when there are long periods of no data arriving from the host, the existence of buffers helps to isolate the process of writing data to tape from the burstiness and drop outs in the incoming data stream from the host. However, if the average data rate received from the host computer drops below a rate at which the data continuously exits the buffer and is written to tape, then the buffer empties, and the tape must be stopped, repositioned to a position prior to a last data written, and then restarted once more data is available to fill the buffer of the tape drive unit.

To address the problem of tape stoppage and repositioning, there have been prior art systems developed which vary the speed of a tape past a write head, and thereby allow the tape to maintain streaming for a longer time period, without stoppage.

Commonly assigned U.S. Pat. No. 6,122,124, incorporated by reference herein, discloses an adaptive tape speed method, in which the problem of tape stoppages is alleviated by keeping the tape moving past a write head at a reduced tape speed to match the incoming data rate, thus giving a slower data rate but with the advantage of maintaining streaming of the tape device.

However, in this prior art adaptive tape speed method, drive electronics limitations dictate a limited range of operation for the speed of the tape, which may not be sufficient to accommodate the full range in variations of data arriving from the host. Data arriving from the host may have variations in data rate which exceed the range of write data rates which correspond to the speeds available, and at which data can be written to tape.

Figure 2:
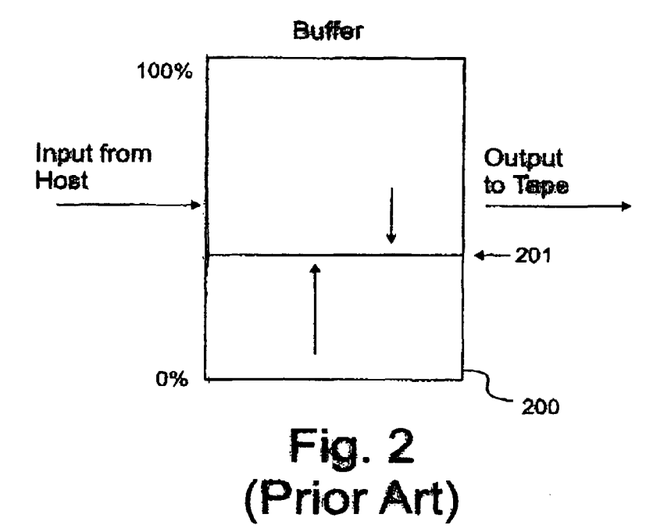
FIG. 2, as described, is a schematic illustration of an occupancy level of a buffer in a prior art tape drive unit.

Referring to FIG. 2 herein, there is illustrated schematically a prior art method of controlling tape speed by measuring buffer occupancy. A buffer device of a tape drive unit receives input data from a host computer, and produces an exit data stream which is output to a tape write head mechanism. The buffer has an occupancy level 201 of data stored in the buffer of between 0% and 100% of the full data storage capacity of the buffer. Depending upon the data rate of bursty data received from the host device in relation to the rate at which data exits the buffer, the occupancy level of the buffer can vary between 0% and 100%. Data arrives from the input host in bursts, fills up the buffer, and is output to the tape at a nominally constant data rate, which is interrupted when the buffer becomes empty. Interruptions of the exit stream of data from the buffer cause tape stoppage and re-positioning.

In the prior art adaptive tape speed method, the occupancy level 201 of the buffer is electronically monitored, and used as a control signal for determining tape speed past a write head.

Figure 3:
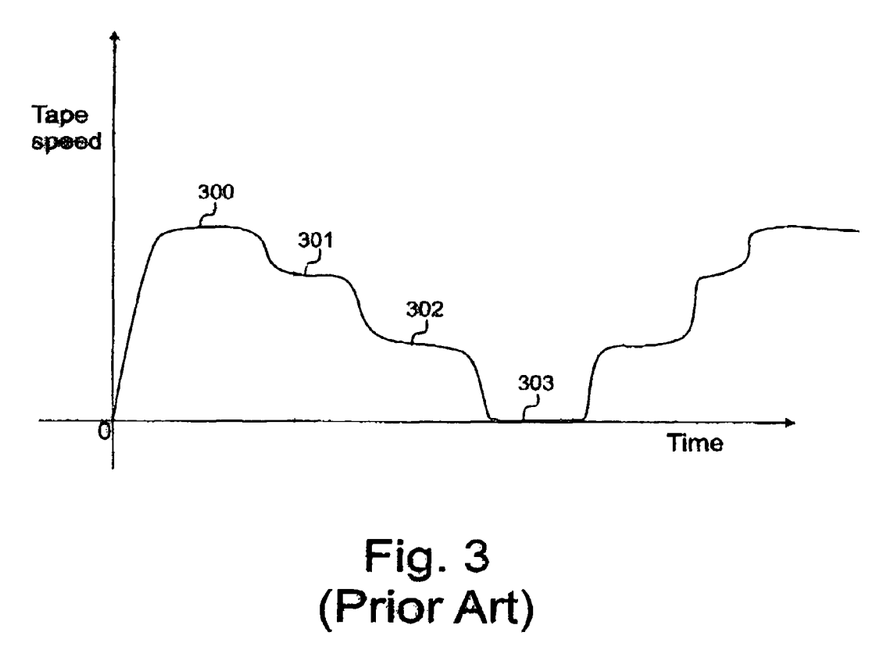
FIG. 3, as described, is a plot of tape speed against time for a prior art tape drive unit using an adaptive tape speed method.

FIG. 3 is an exemplary plot of tape speed past a write head, against time under various burst conditions of data received from a host computer device by a tape drive unit operating according to the known adaptive tape speed method.

Under normal operation, where data is being input from the host and filling up the buffer, and an instantaneous occupancy level of the buffer is above a first pre-determined limit, then the tape speed is controlled to be at its maximum value 300. However, if the data stream received from the host has a drop out of data, then the buffer continues to empty of data, but no further data is received by the buffer and the instantaneous occupancy level falls. When the occupancy level falls to a second pre-determined limit, this triggers a reduction in tape speed to a second level 301. Since the tape drive has write electronics which matches the data rate of data exiting the buffer to the tape speed, there is a corresponding reduction in output data rate from the buffer. This keeps the tape streaming at a lower write data rate, until the buffer fills up again. If the buffer empties even further, then further pre-determined levels trigger further reductions in tape speed 302. If the buffer becomes empty, then the tape must be stopped as indicated by level 303, which incurs the penalty of a time delay in repositioning the tape relative to the write head. Operation of the tape can resume at various tape speed levels, depending upon the amount of data received from the host and the occupancy level of the buffer.

Conventionally, during a data dump, or a data backup operation, host computers have generally been able to provide data to a tape drive unit at a higher average data rate than the data can be directly written to a tape data storage medium even though there may be instances of tape stoppage where bursty data is received from the host.

It is known to compress incoming data received from a host computer device prior to writing the data to a tape data storage medium. Data compression provides two main advantages as follows:

Firstly, it allows a greater amount of information to be stored to a tape storage medium using compression, than storing data directly in an uncompressed state to the tape data storage medium.

Secondly, since the rate of data arriving from the host computer is generally higher than the rate of data which can be written to tape, compression allows a reduction in data rate written to the tape data storage medium, compared to the rate of data arriving from the host computer. The difference in data rate depends on the amount of compression which can be applied to the data. This assists the tape drive in keeping up with writing the data to tape as the data arrives from the host computer.

Figure 4:
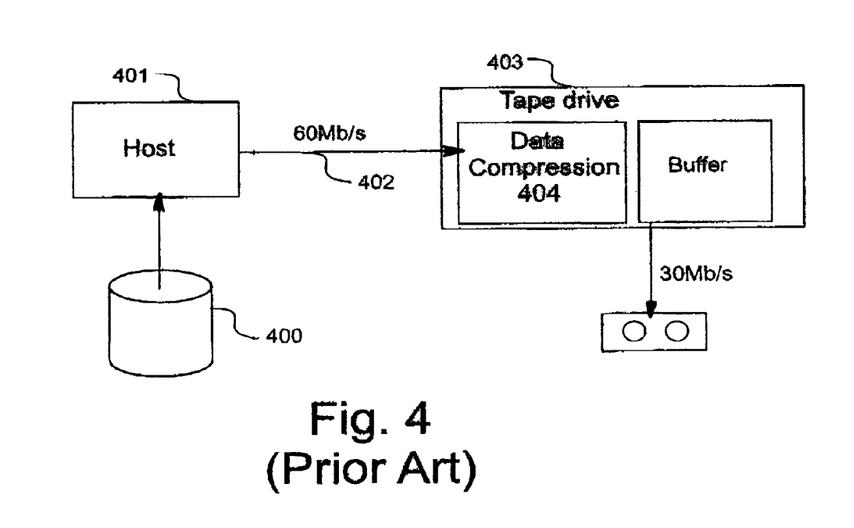
FIG. 4, as described, is a block diagram of a further prior art host computer and prior art tape drive unit, including a compressor between a host computer and the tape drive.

FIG. 4 is a block diagram of another prior art host computer and tape drive unit, wherein there is a difference in data rate between data transferred from the host computer to the tape drive unit, and data written to tape. Data transferred from an internal data storage device 400 of a host computer 401 is transferred across a connection 402, in this example at a rate of 60 Mbytes/s. The data arrives at the tape drive unit 403, and is received by a data compression engine 404 which compresses the data. Varying compression ratios are achieved depending upon the inherent compressibility of the incoming data. In the example shown, an average compression ratio of 2:1 is achieved, and data is written to the tape data storage medium at a data rate of 30 Mbytes/s.

In prior art host computer and tape drive units, data compression has a beneficial effect in at least partially isolating the data rate of data written to tape, from the bursty data, at a higher data rate, arriving from the host computer.

Some host computer operating systems control the data compression ratio in the back up tape drive device via different device files and can disable compression if required. However, this is only done on a once and for all basis at the start of a data storage session. The compression ratio is not changed during the entire back up, regardless of ongoing performance of a data storage back up operation. The prior art host computer entity which can control compression has no visibility of the suitability of the data rate arriving at the tape drive entity which performs the compression, and so cannot set up the data compression ratio in the most effective way.

There is a general trend to increase the write rate of data written from a write head to a tape in a tape drive unit. As the write data rate from write head to tape increases to approach the data rate of incoming data from the host, the buffer system becomes less effective at isolating the write operation from drop outs in data arriving from the host, causing stoppage occurrences to increase. The stoppage occurrence increases even where prior art methods, such as the adaptive tape speed method, are used. As the write data rate to tape increases towards the data transfer rate from host to the tape drive unit, the problem of stoppages becomes more acute with a higher incidence of tape stoppages occurring.

As tape drives get faster and are capable of writing data to tape at a higher data rate, they do not necessarily represent the rate determining stage in a data storage system when performing data storage operations, for example data back ups. System performance is frequently limited by the ability of a host computer to supply data fast enough to keep the tape drive streaming. If the incoming data rate from a host computer drops below a minimum acceptable data rate, then the tape must be stopped, repositioned prior to the last data written, and then restarted once sufficient data is available from the host computer.

Once the host stops supplying data for an extended period and streaming of the tape stops, a delay of several seconds is incurred whilst the tape repositions itself, which is a far higher delay than a latent delay caused by the host in recommencing supply of bursts of data. Therefore, stoppages in streaming are to be avoided wherever possible, since the stoppages become the rate determining step in transfer of data from the host of the tape data storage medium when they occur.

SUMMARY OF THE INVENTION

In accordance with one aspect of the invention an apparatus for and method of writing data to a tape storage medium comprises temporarily storing the data, and selectively compressing the data prior to temporarily storing the data, wherein the selective compressing is a function of the amount of data being temporarily stored. The temporarily stored data are read to the tape.

In one embodiment the rate at which temporarily stored data are written to the tape is effectively varied, preferably as a function of the rate at which the data is applied to an apparatus for performing the selective compressing or as a function of the amount of temporarily stored data.

Preferably the rate at which temporarily stored data are written to the tape is varied by varying the speed of the tape.

Typically, the data are applied in bursts to apparatus for performing the compression and data are continuously applied to the tape as long as data is temporarily stored.

Preferably, all the data in a particular burst is compressed in the same way.

The function controlling compressing of the data is preferably whether the amount of data being temporarily stored exceeds a predetermined amount.

Preferably the apparatus for temporarily storing includes a buffer memory, typically responsive to an output of a data compressor.

A further aspect of the invention relates to a memory storing a program for causing a computer to control writing of data to a tape storage medium, so that the data are temporarily stored, selectively compressed as a function of the amount of temporarily stored data, and written from the temporary storage to the tape.

According to a further aspect of the present invention a tape drive unit comprises: a data compressor for compressing an incoming data stream; a memory for storing data of said incoming data stream; a monitor for monitoring a data occupancy level of said buffer memory; and a controller for enabling or disabling said data compressor. The control module is operable to disable said data compressor in response to said data occupancy level of said memory being below a predetermined level.

According to another aspect of the present invention, a data processing device comprises: a data compression engine capable of applying compression to an incoming data stream; a buffer memory capable of storing data of said incoming data stream; wherein said device is operable to disable said data compression engine in response to a data occupancy level of said buffer memory being below a predetermined level.

According to an additional aspect of the present invention, a data processing device comprises: means for applying compression to an incoming data stream; and means for storing data of said incoming data stream; wherein said data processing device is operable to disable the data compression means in response to said data occupancy level of said means for storing data being below a predetermined level.

According to an added aspect of the present invention a data processing device comprises: a data compression engine capable of applying compression to a data stream received by said device; and a buffer memory capable of storing data of said received data stream; said device being operable such that said compression engine is controlled to apply compression processing to said received data stream in response to said amount of data in said buffer memory being at a relatively high value, and is controlled to be inactive such that said received data stream is entered into said buffer memory without being compression processed by said compression engine, in response to said amount of data in said buffer memory being at a relatively low value.

According to yet a further aspect of the present invention, a memory stores program instructions for causing a data processor to: monitor a data occupancy level of a buffer memory; disable a compression engine in response to said data occupancy level of said buffer memory being below a predetermined level.

According to yet another aspect of the present invention, a memory stores program instructions for controlling a processor that is arranged to control data processing of an incoming data stream. The program instructions include a monitoring module for monitoring a data occupancy level of a buffer memory; and a control module for enabling or disabling a compression engine. The control module is operable to send a disable signal for disabling said data compression engine in response to said data occupancy level of said buffer memory being below a predetermined level.

According to yet an added aspect of the present invention, a method of writing data to a tape data storage medium comprises: receiving an incoming data stream into a buffer memory; in response to the buffer data occupancy level being at or above a predetermined threshold level, applying data compression to said incoming data stream, upstream of said buffer, and in response to said data occupancy level falling below said predetermined threshold level, receiving said incoming host data stream directly into said buffer, without applying any compression.

According to a further aspect of the present invention, a method of writing data to a tape data storage medium comprises: receiving an incoming data stream into a buffer memory; monitoring the data occupancy level of said buffer memory; in response to said data occupancy level being at or above a predetermined threshold level, applying data compression to said incoming data stream upstream of said buffer; and in response to said data occupancy level falling below said predetermined threshold level, receiving said incoming host data stream directly into said buffer, without applying any compression.

According to still an additional aspect of the present invention a method of writing data to a tape data storage medium comprises: receiving a data stream in bursts of data at a first data rate into a buffer memory; transferring data of said data stream from said buffer memory to said tape data storage medium at a second data rate; monitoring the data occupancy level of said buffer memory; depending upon the value of said data occupancy level, varying the speed of said tape data storage medium past a write head; and depending upon the value of said data occupancy level, activating or de-activating a data compression engine connected upstream of said buffer memory that selectively compresses data of said host data stream prior to entry of said host data stream into said buffer memory.

According to still an added aspect of the present invention, a method of controlling a data rate of data exiting a buffer memory comprises: receiving a data stream at a first data rate; selectively producing a compression processed data stream by selectively applying or not applying compression to said data stream; receiving said selectively compression processed data stream into a buffer memory; and outputting said selectively compression processed data stream as an output of said buffer memory at a second data rate; wherein said process of selectively applying compression to said data stream comprises: applying a compression algorithm to said data stream in response to a data occupancy level of said buffer memory being at or above a predetermined threshold limit; and disabling application of said compression algorithm to said data stream in response to a data occupancy level of said buffer memory falling below said pre-determined threshold limit.

According to still a further aspect of the present invention, a method of data processing a stream of data comprises: receiving said data stream; supplying data of said received data stream to a buffer memory; applying compression processing to said received data stream under conditions of said amount of data in said buffer memory being relatively high; and entering said received data stream into said buffer memory without compression processing said data stream under conditions of said amount of data in said buffer memory being relatively low.

BRIEF DESCRIPTION OF THE DRAWINGS

For a better understanding of the invention and to show how the same can be carried into effect, there is now described by way of example only, specific embodiments, methods and processes according to the present invention with reference to the accompanying drawings in which.

DETAILED DESCRIPTION OF THE DRAWING

There is now described by way of example a specific mode contemplated by the inventors. In the following description numerous specific details are set forth in order to provide a thorough understanding of the embodiments of present invention. It will be apparent however, to one skilled in the art, that the present invention can be practiced without limitation to these specific details. In other instances, well known methods and structures have not been described in detail so as not to unnecessarily obscure the description.

Figure 5:
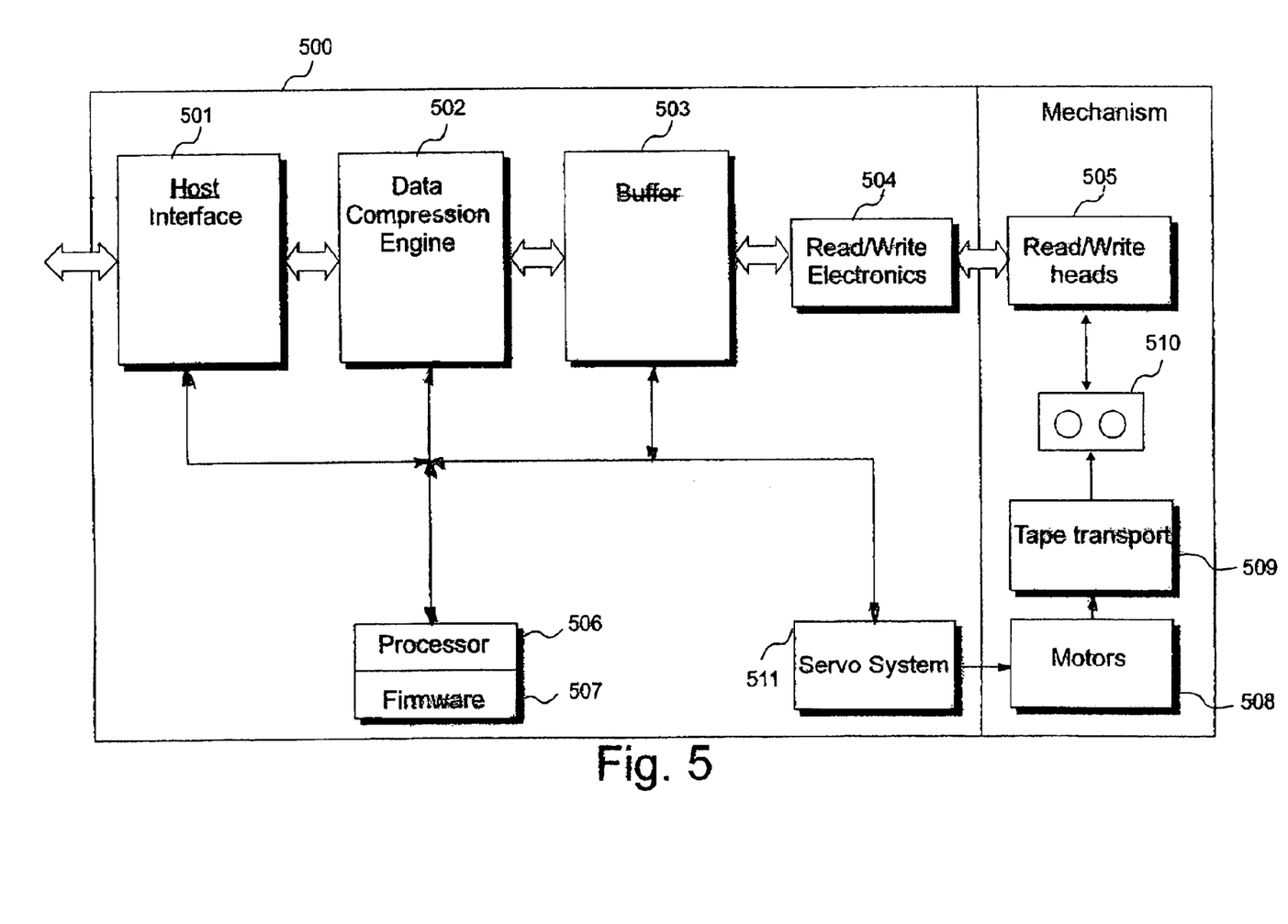
FIG. 5 is a block diagram of modules of a tape drive unit according to a specific embodiment of the present invention.
Figure 7:
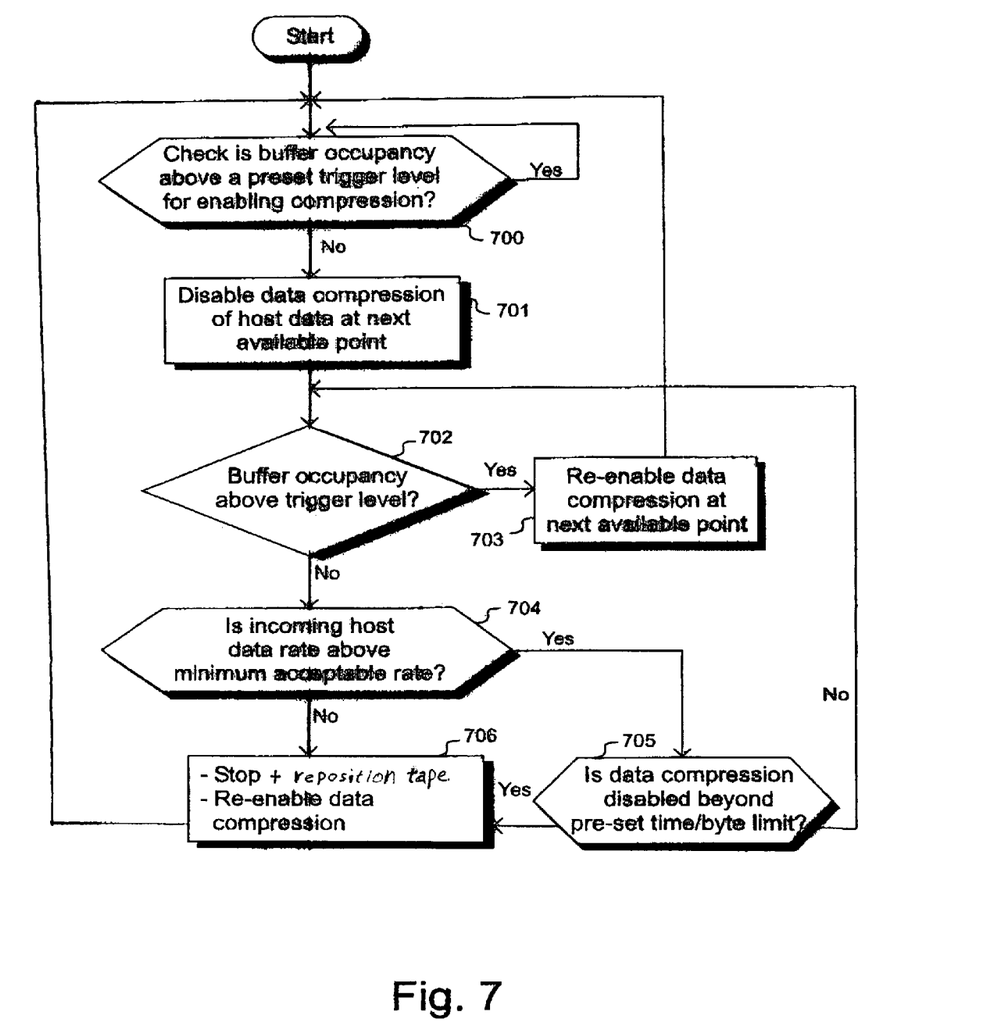
FIG. 7 is a flow diagram of a first method of operating a tape drive unit, according to a specific embodiment of the present invention, for regulating a stream of data between a host interface and a tape data storage medium.
Figure 8:
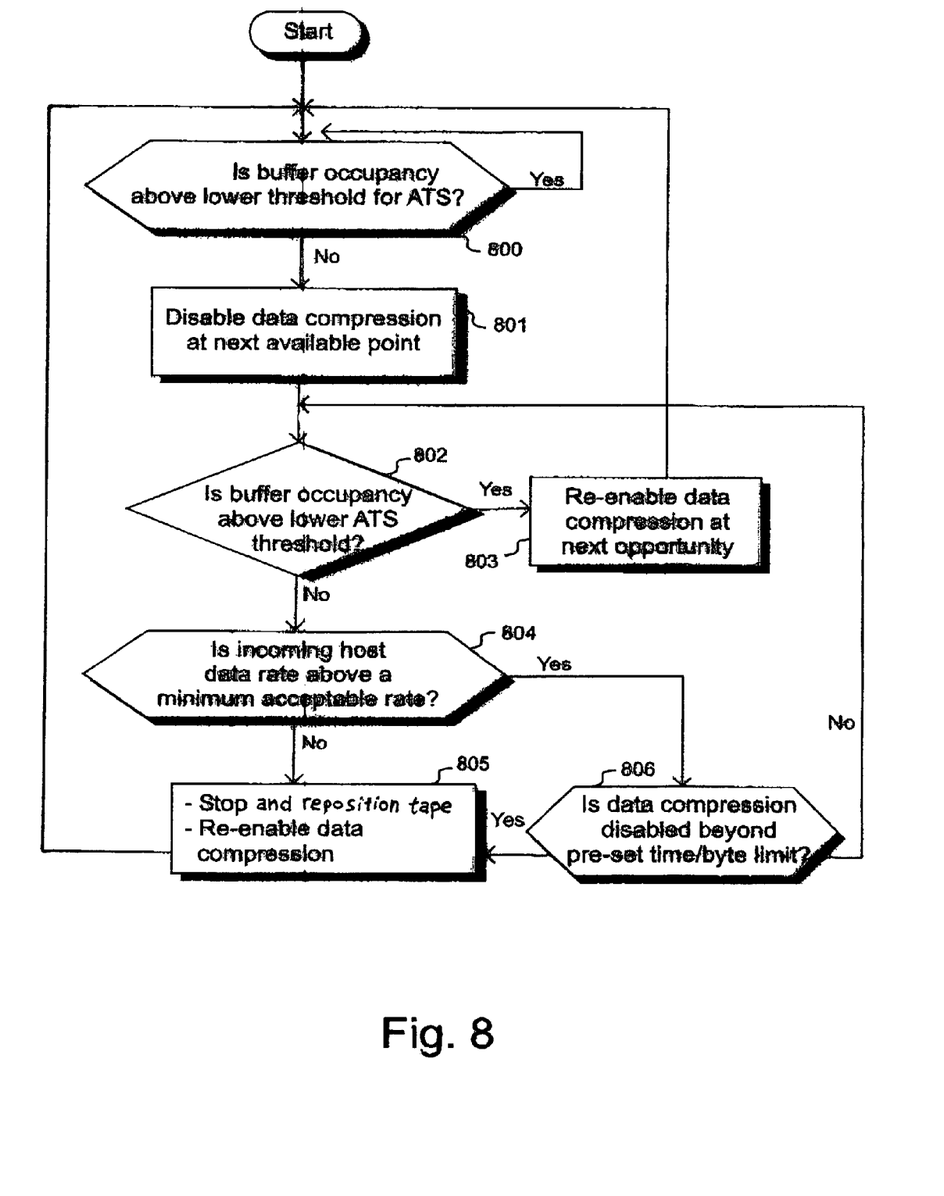
FIG. 8 is a flow diagram of a second method of operating a tape drive unit according to a specific embodiment of the present invention for regulating a flow of data between a host interface and a tape data storage medium, where the method operates in conjunction with a prior art adaptive tape speed method.

FIG. 5 is a block diagram of a tape drive unit 500 comprising a host interface 501 for receiving incoming data from a host computer (not shown); a data compression engine 502 for compressing data received from the host interface; a buffer 503 for transiently (i. e. temporarily) storing data; a read/write electronic control component 504 for controlling read and write operations to and from a set of read/write heads 505; a processor 506 and an associated set of firmware control elements 507 for providing instructions to processor 506 for causing the processor to control the remainder of tape drive unit 500 to perform the method described in connection with FIG. 7 or FIG. 8; a set of drive motors 508 for driving a tape cassette transport mechanism 509 which drives a tape cassette 510; and a servo system 511 for controlling the set of drive motors. In a preferred embodiment, the tape has plural parallel tracks that extend longitudinally of the tape, i.e., each track extends parallel to edges of the tape.

The control elements 507 can be "firmware" modules comprising a set of program instructions, stored in a non volatile memory such as an EEPROM or software stored in a memory such as a floppy or hard disk, a CD ROM or a DVD. Alternatively, the functions performed by processor 506 and elements 507 and by functions can be performed by a logic circuit, for example an application specific integrated circuit (ASIC) or a programmable logic array (PLA). Alternatively, any other convenient arrangement could be used to provide the functions performed by processor 506 and control elements 507.

A data path through the tape drive mechanism exists between the host interface 501, data compression engine 502, buffer 503, read/write electronics 504 and read/write heads 505.

The processor 506 and control elements 507 control host interface 501, data compression engine 502, buffer 503, read/write electronics 504, and servo system 511 to write data to the tape data storage medium via the write heads, and conversely, to read data from the tape data storage medium via the read heads.

According to a specific embodiment, the control elements 507 monitor both the incoming data rate to interface 501 from the host computer device, and the compression ratio imposed by compression engine 502 on the data compressor thereby. These two pieces of information determine when to turn on or off data compression within tape drive unit 500. Turning off data compressor 502 reduces the effective write data rate required to maintain continuous streaming of the tape data storage medium, compared to when compression is applied.

Processor 506 changes the data compression ratio of compressor 502 in response to a function of the write data rate to the tape.

Figure 6:
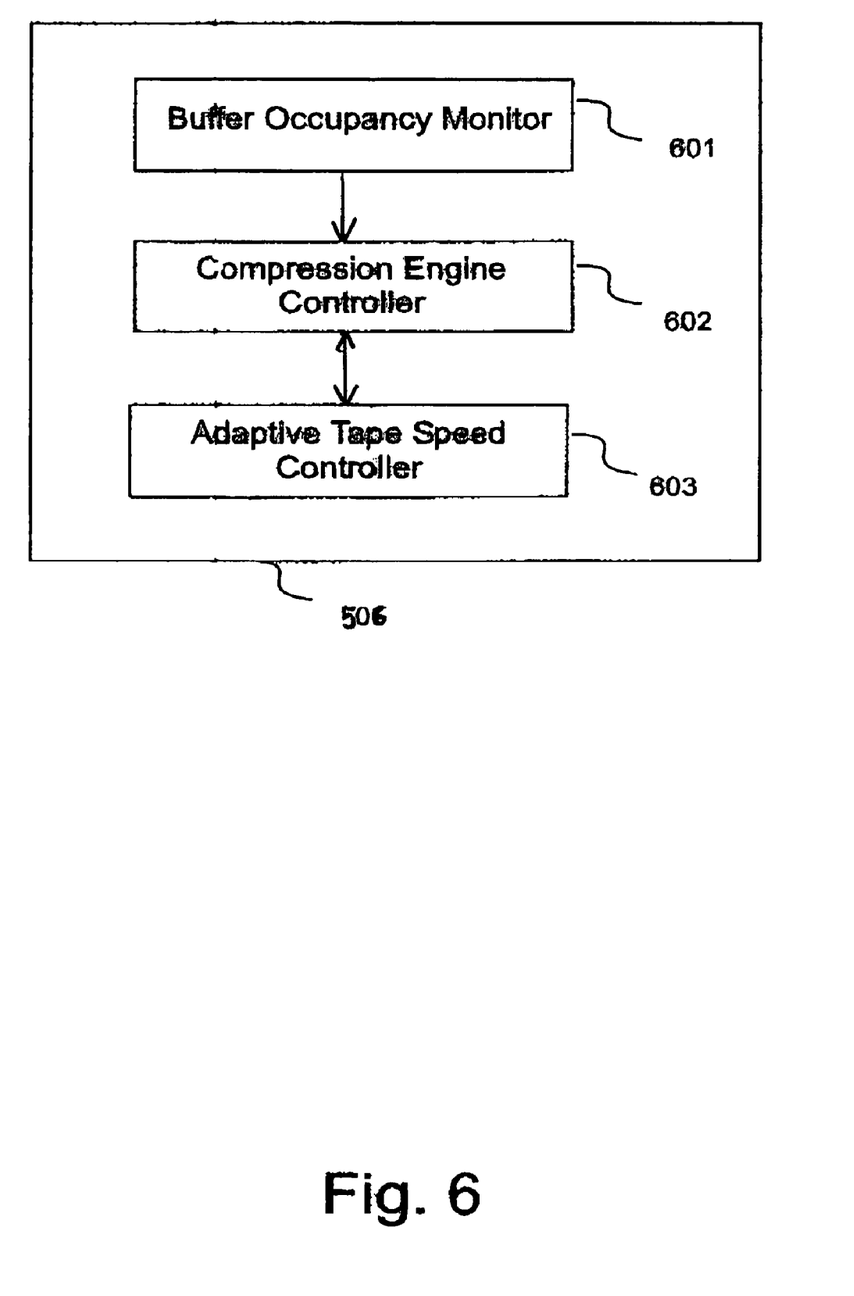
FIG. 6 is a block diagram of a set of functional modules for monitoring buffer occupancy level, controlling a compression engine, and controlling a tape transport mechanism to apply an adaptive tape speed control method according to a specific implementation of the present invention.

FIG. 6 is a block diagram of elements of processor 506 for controlling the compression ratio of data compressor 502 in response to (1) the data occupancy level of buffer 503 and (2) the speed of the tape on which burst data from the host computer are being written. Processor 506 comprises: a buffer 503 occupancy level monitoring module 601; a data compression engine 502 control module 602; and optionally, an adaptive tape speed control module 603, in addition to other known modules for controlling the read/write electronics 504, and servo-system 511. The other known control modules can comprise a known adaptive tape speed control module 603, for embodiments where the adaptive tape speed method is used.

There is now described in connection with FIG. 7, steps processor 506 takes in a first method of operation of a tape drive unit 500. In the method of FIG. 7, data compression engine 502 is controlled in response to the data occupancy level of buffer 503 in tape drive unit 500. In the FIG. 7 method, there is control of a streaming operation of a tape data storage medium by varying compression of an incoming host data stream.

In the following description, compression is by data compression engine 502 of the tape drive unit 500. The skilled person will appreciate that the host data received from the host computer may have been pre-compressed to a varying extent by an application at the host computer, or elsewhere in a network. The tape drive unit 500 is capable of applying further compression, with a varying compression ratio, depending on the inherent compressibility of the data received by host interface 501 from a source external to unit 500.

During step 700, processor 506 continuously monitors buffer 503 to check the occupancy level of the buffer. Buffer 503 or processor 506 has a pre-set occupancy level that is set as a trigger level to trigger enabling of the data compression engine 502. As long as the occupancy level of buffer 503 is above the trigger level, data compression engine 502 continues to compress incoming data received from the host device, so that the data received by the buffer, down stream of the data compression engine, is compressed data. Compression engine 502 applies various levels of compression to the data the engine receives from interface 501. The applied compression level depends on the intrinsic compressibility of the incoming data to interface 501. If the host device sends to tape drive unit 500 data which has already undergone a high level of compression, further compression may not be possible. On the other hand where there is a large amount of redundancy of information within the incoming host data, compressor 502 can apply a higher degree of compression. The compression engine 502 continues to be enabled, as long as the occupancy level of buffer 503 remains above the pre-set trigger level. However, if the occupancy level of buffer 503 falls below the pre-set trigger level, then, in step 701, the data compression of engine 502 by the compression engine controller module 602 disables at the next available point at which the compression can be turned off. Because compression engine 502 takes chunks of data in order to run its compression algorithm, it is likely that the compression engine is processing a chunk of data when processor 506 derives a command signal for turn-off of engine 502. Consequently, processor 506 does not turn off compression engine 502 immediately, but turn off of engine 502 is delayed until the compressor has finished compressing that whole chunk of data. As soon as the compression engine 502 finishes compressing its current data chunk, consistent with proper operation of the compression algorithm and the tape format specification, then processor 506 disables the compression engine. With compressor 502 turned off, the host data from interface 501 is fed directly to buffer 503, filling up the buffer without any compression having been applied by tape drive unit 500. With compression processed or non-compression processed data entering the buffer 503, data is continuously streamed out of the buffer through the read/write electronics 504 and to the write heads, to be written to the tape data storage medium. While uncompressed data are supplied by interface 501 to buffer 503, as an ongoing process, the buffer occupancy level is continuously monitored by processor 506 or the buffer during step 702. In response to the occupancy level of buffer 502 exceeding the trigger level again, processor 506 re-enables (during step 703) data compression engine 502 at the next available point in the data, and steps 700-702 continue. In this state, data arrives at host interface 501 from the host computer at a high enough rate that the data can be compressed by the tape drive 500, and fills up buffer 503 at a rate faster than the rate the buffer is emptied and faster than the rate of writing the data being emptied from the buffer directly onto the tape.

In response to processor 506 disabling data compression engine 502, and as long as the occupancy level of buffer 503 remains below the trigger level for re-enabling the data compression engine during step 702, the processor advances to step 704. During step 704, processor 506 continuously monitors host interface 501 to determine from the host computer whether the incoming data rate from the host computer is above a minimum acceptable data rate. If the data rate from the host computer is above the minimum acceptable data rate, processor 506 is enabled during step 705. Processor 506 monitors the amount of non-usage of data compressor 502 which has occurred. Processor 506, during step 705, determines whether that amount of non-usage exceeds a predetermined limit. Non-usage of the compression engine 502 can be determined (1) as a time period over which the compression engine has been disabled, or (2) as a number of bytes which have been received by interface 501 from the incoming host computer whilst the compression engine 502 has been disabled, or (3) the amount of data which has been written to tape whilst the compression engine 502 has been disabled. As long as the pre-determined limit for non-usage of the compression engine 502 has not been reached, the compression engine remains disabled, causing incoming data coupled from the host to interface 501 which has not been compression processed by the compression engine to continue to be fed directly into buffer 503. At the same time, as an ongoing process, streaming data is fed from the buffer 505 to be written directly to the tape. Processor 506 controls servo system 511 for varying the tape speed. System 511 controls the speed of motors 508, such that the transport mechanism 509 of tape data storage medium 510 keeps the tape moving past the write heads as data are written to the tape, even when data which has not been compression processed by compression engine 502 is being written to the tape.

However, once the non-usage limit of compression engine 502 has been reached, either the pre-set time limit is reached, or a predetermined number of bytes have been received from the host, or written to tape, and the buffer occupancy level is still below the trigger level, then, during step 706, processor 506 activates servo system 511 to stop motors 508 and tape transport 509. Then, during step 706, processor 506 activates servo system 511 to drive motors 508 and tape transport to re-position the tape. This stoppage and re-positioning of the tape typically incurs a time delay of a few seconds. Then during step 706 the data compression engine 502 is re-enabled, and once the tape begins to stream again, operation re-commences from process 700 as described above.

On the other hand, if processor 506 determines during step 704, that the buffer occupancy level is below the trigger level and the average host data rate drops below the pre-set minimum acceptable data rate, indicating that not enough data is being received by interface 501 from the host computer, then the processor activates servo system 511 to cause immediate stoppage of the tape and tape re-positioning occurs; such stoppage and re-positioning usually takes a few seconds. At the same time, compression engine 502 is re-enabled during step 706, and further operation continues from process 700 substantially as described above.

In the above operation, by monitoring the data occupancy level of the buffer relative to a predetermined trigger level, when the occupancy level falls below that predetermined trigger level, the compression engine 502 is disabled, so data that interface 501 receives from the host is fed directly into buffer 503 at a data rate that is approximately the same as the rate at which the data is received from the host computer. The data from the host can therefore start filling up buffer 503 since, in general, this data rate of the data from the host is faster than the data rate at which data leaves the buffer to be written to the tape. In response to the data in the buffer 503 filling to above the predetermined trigger level, the compression engine 502 is re-activated so that incoming data to interface 501 from the host computer is compression processed at the tape drive 500, resulting in a lower rate of data being supplied to the buffer, than the incoming host data rate. In this mode of operation, data is being compressed once it arrives at the tape drive unit, and the rate determining stage in the tape drive unit is the rate at which data can be written directly to the tape.

There is now described, in connection with FIG. 8, a second specific method of operation of the tape drive unit 500 of FIGS. 5 and 6, in which the tape drive unit uses a known prior art adaptive tape speed method (previously described), in combination with selective application of data compression to an incoming data stream.

During step 800 of FIG. 8, processor 508 checks to determine if the buffer 503 occupancy level is above a lower threshold limit necessary for operation of the adaptive tape speed method. While the buffer 503 occupancy level is above this lower threshold limit the adapted tape speed method can employ other higher buffer occupancy threshold levels. In response to the occupancy level of buffer 503 being above the lower threshold limit, processor 506 responds to a signal from buffer 503 indicative of the buffer 503 occupancy level to control servo system 511 to speed up or slow down the tape to avoid stoppages in the tape movement. The lower threshold limit of buffer 503 (of the adaptive tape speed method) represents the lowest buffer occupancy at which the adaptive tape speed method will operate.

If the buffer 503 occupancy drops below the lower threshold limit, the tape speed cannot be slowed any further. If processor 506 detects the buffer 503 occupancy level falling below the lower threshold level for the adaptive tape speed method, the program controlling processor 506 advances to step 801. During step 801 processor 506 disables data compression engine 502 at the next available point. As previously described herein, it may not be possible to immediately disable compression engine 502 because the compressor is in the middle of processing a data chunk. Compression of the data chunk being presently compressed is completed before the data compression engine 502 is disabled.

After compressor 502 has been disabled as a result of step 801, processor 506 advances to step 802 during which the processor continuously monitors the buffer 502 occupancy level relative to the lower adaptive tape speed (ATS) threshold level. In response to processor 506 detecting a rise of the buffer 502 occupancy level above the lower ATS threshold level again, the processor advances to step 803.

During step 803 processor 506 re-enables compressor 502 at the next opportunity, and normal operation of the tape drive unit, within the ATS mode continues as described above with reference to steps 800-802. However, if the buffer 502 occupancy level remains below the ATS threshold limit, then during step 804, processor 506 continuously checks interface 501 to determine whether the incoming host data rate is above a minimum acceptable rate. As long as the data rate is above a minimum acceptable data rate, then in step 806 processor 506 continuously monitors compressor 502 to determine the non-usage level of the compression engine. Processor 506 monitors the non-usage level by measuring (1) the length of time during which the compression engine 502 has been disabled, or (2) the number of bytes which interface 501 has received from the host computer whilst the compression engine has been disabled, or (3) the number of bytes written to tape whilst the compression engine has been disabled. If the measure of non-usage of data compression engine 502 is within a predetermined limit, processor 506 activates tape drive unit 500 to cause unit 500 to continue in its mode of operation such that data compression engine 502 is turned off, and the adaptive tape speed method is operating on its lowest tape speed. In this mode of operation, heads 502 continue to write data to the tape, and the tape keeps streaming at its lowest speed. The data entering buffer 502 is not compression processed by the tape drive unit 500 during this mode.

If, while the buffer 503 occupancy level is below the lower ATS threshold, the incoming host data rate falls below a minimum acceptable data rate, then during step 805 processor 506 supplies signals to servo system 511 to stop tape transport mechanism 509 immediately and then re-position the tape. While the tape is stopped and re-positioned, further data may arrive at interface 501 from the host computer, causing loading of buffer 503 and subsequent enabling of compression engine 502, and further operation continues as in steps 800-801 as described above.

In the method of FIG. 8, a combination of the prior art adaptive tape speed method, and control of the compression engine extends the operating range over which tape transport can continue without stoppages of streaming. The combination of the adaptive tape speed method and the compressor method enables variation of tape speed and slowing down of the tape speed for continued writing of compressed data, as long as there is a sufficient amount of data arriving from the host computer. However, if the rate of data arriving from the host drops to such a level that buffer 503 empties below an occupancy level at which the adaptive tape speed method would normally cause a tape stoppage, the compression engine 502 is disabled, to effectively increase the rate at which data is fed from the host interface directly to the buffer, compared to the situation where compression is being applied. The increase in the rate of data coupled from interface 501 to buffer 503 while compressor 502 is disabled enables the buffer to fill faster than when compressed data is applied by the compression engine 502 to buffer 503. Continuously with this process, data exits buffer 503 at a data rate consistent with the lowest tape speed. As soon as the rate of incoming data from the host computer is high enough that the buffer 503 occupancy level rises above the lower ATS threshold, the compression engine 502 is re-enabled and compression of incoming data resumes.

The specific method disclosed herein can be performed in a tape drive unit in addition to the known adaptive tape speed method, or can be performed independently of the adaptive tape speed method.

In response to the data rate reaching the lower limit of the adaptive tape speed range and the compression ratio of compressor 502 being above a certain threshold level (which can be determined empirically), the data compression engine 502 is disabled by processor 506.

Processor 506 maintains compressor 502 in a disabled state until it detects:

(a) the rate of data the host computer applies to interface 501 increasing to above the lower limit of the adaptive tape speed threshold level; or (b) the rate of data the host computer applies to interface 501 decreasing below the minimum data rate of the drive 500; or (c) compression engine 502 being disabled for an excessive time period.

In case (a) above, processor 506 re-enables compression engine 502, and supplies servo system 511 with a command to continue operation of tape transport 509.

In case (b) processor 506 supplies a command signal to servo system 511 to cause tape transport 509 to stop and re-position the tape. Firmware 507 can be programmed to control processor 506 to restart the tape with compression engine 502 enabled or disabled, as a matter of specific choice.

In case (c) firmware 507 is programmed so processor 506 prevents drive 500 from running in a mode in which data is not compressed for the whole duration of a backup. If data is continuously written to the tape in the un-compressed mode, there is a reduced tape data storage capacity.

One possibility for 'tuning' the system is to allow the host computer supplying data to unit 500 to specify, at the start of a back up session, the maximum time or amount of data to be written in an uncompressed mode. Also, the host computer can select whether to set the tape drive 500 to 'optimise for performance' i.e. optimise for keeping the tape transport mechanism streaming, or to 'optimise for capacity' in which case, the above specific methods of operation of a tape drive unit 500 are not enabled, causing the tape drive to operate in a mode in which compression is always applied, or in a mode with the adaptive tape speed feature, in which compression is always applied, but at the disadvantage of continuous interruptions through tape stoppage and re-positioning, with all the associated problems of tape drive reliability of sub-optimal delays due to tape stoppage and re-positioning.

While there have been described and illustrated specific embodiments of the invention, it will be clear that variations in the details of the embodiment specifically illustrated and described may be made without departing from the true spirit and scope of the invention as defined in the appended claims.

The invention claimed is:

1. A tape drive unit comprising:
a data compression engine configured to selectively apply compression to an incoming data stream and output a compressed data stream;
a buffer memory configured to store said compressed data stream;
a monitoring element configured to monitor a data occupancy level of said buffer memory configured to store said compressed data stream; and
a control element configured to disable said data compression engine based upon a predetermined level of the data occupancy level of the buffer memory.

2. The tape drive unit as claimed in claim 1, comprising:
a tape transport mechanism for transporting a tape data storage medium past a transducer;
wherein said tape transport mechanism continues streaming of said tape, whilst said data compression engine is in an enabled mode, and whilst said compression engine is in a disabled mode.

3. The tape drive unit as claimed in claim 1, comprising:
a tape transport mechanism configured to transport a tape data storage medium past a transducer; and
a tape speed control element configured to control said tape transport mechanism for transporting said tape at a variable speed;
wherein said tape speed is variable according to a data occupancy level of said buffer memory.

4. A data processing device comprising:
a data compression engine configured to selectively apply compression to an incoming data stream and output a compressed data stream; and
a buffer memory configured to store said compressed data stream;
wherein said device is configured to disable said data compression engine in response to a data occupancy level of said buffer memory storing compressed data, wherein the data occupancy level is below a predetermined level.

5. The data processing device as claimed in claim 4, further comprising:
a monitoring element configured to monitor the data occupancy level of said buffer memory; and
a control element configured to enable or disable said data compression engine in response to an indication of monitored data occupancy level of said buffer memory derived by the monitoring element.

6. A data processing device comprising:
means for applying compression to an incoming data stream and generating a compressed data stream; and
means for storing data of said compressed data stream;
said data processing device is configured to disable the data compression means in response to a data occupancy level of the means for storing data of the compressed data stream being below a predetermined level.

* * * * *

UNITED STATES PATENT AND TRADEMARK OFFICE
CERTIFICATE OF CORRECTION

PATENT NO. : 7,991,930 B2  
APPLICATION NO. : 10/783031  
DATED : August 2, 2011  
INVENTOR(S) : Christopher Martin Page 1 of 1

It is certified that error appears in the above-identified patent and that said Letters Patent is hereby corrected as shown below:

In column 14, line 9, in Claim 6, before "said" insert -- wherein --.

Signed and Sealed this  
Twenty-first Day of February, 2012

David J. Kappos  
*Director of the United States Patent and Trademark Office*